Nov. 20, 1951     T. O. KOSATKA     2,575,818

FLUID SEAL

Filed Jan. 7, 1949

INVENTOR.
Thomas O. Kosatka
BY George E. Haight &
George H. Simmons
Attys.

Patented Nov. 20, 1951

2,575,818

UNITED STATES PATENT OFFICE 2,575,818

FLUID SEAL

Thomas O. Kosatka, Chicago, Ill., assignor to Victor Manufacturing & Gasket Co., Chicago, Ill., a corporation of Illinois Application January 7, 1949, Serial No. 69,758

3 Claims. (Cl. 288—3)

This invention relates to a fluid seal and more particularly to a fluid seal which is adapted to seal the space between a flanged rotatable shaft and a bore in a stationary housing.

An object of the invention is to provide a unitary sealing structure for convenient installation to seal the space between a stationary housing and rotatable radial surface on a shaft.

Another object of the invention is to provide a face type seal which will constantly adjust itself to compensate for wear during use.

A further object of the invention is to provide a seal for insertion between a rotatable shaft and a bore in a housing which will automatically adjust itself to compensate for longitudinal movement and misalignment of the shaft with respect to the housing.

Another object of the invention is to provide a seal capable of holding against high pressures and temperatures such as are encountered in the pumping of hot liquids.

A further object of the invention is to provide a seal which is economical to manufacture and long-lived in use.

Further objects of the invention, not mentioned here, will be apparent from the detailed description and claims which follow, reference being had to the accompanying drawings in which a preferred embodiment of the invention is shown by way of example and in which:

It frequently happens in the design of machinery that a rotating shaft projects from a stationary housing which contains a fluid such as oil, grease, water, etc., that must be retained in the housing, and there are numerous packing and sealing devices provided for this purpose. In cases where the pressures and temperatures encountered are relatively low, the sealing devices usually include a flexible sealing member that presses radially against a cylindrical surface on the shaft to form a seal therewith. In the case of pumps for handling relatively hot liquids, and in many other adaptations, the sealing element is in the form of an annulus which encircles but does not engage the shaft, and bears against a radial shoulder or flange upon the shaft, to form a seal therewith. It is to a sealing device of this latter type that the present invention particularly relates.

The annular sealing device usually consists of graphite compressed with a binder under sufficient pressure to form a unitary structure that is capable of taking a high polish. Such a device, when engaged against a smooth polished radial surface on the shaft, forms a fluid tight low friction seal therewith, which seal is capable of holding against relatively high pressures even when subject to rather high temperatures. In other instances, a fibrous material such as felt or asbestos is impregnated with a graphite or graphite compound and compressed to form a hard structure that is capable of taking a high polish and of maintaining a fluid tight low friction seal against relatively high pressures and temperatures.

In most instances, rotating shafts are subject to some end play, and in addition oftentimes are not perfectly aligned with the stationary housing through which they project, with the result that the radial surface on the shaft is not truly parallel to the housing nor is it always the same distance therefrom, but nevertheless, the sealing element must maintain a tight seal with this surface at all times. The sealing element must therefore be capable of limited movement with respect to the housing. For convenience in handling during assembly, the sealing device should be a self-contained unit. The sealing device of the present invention fulfills these requirements.

Figure 1:
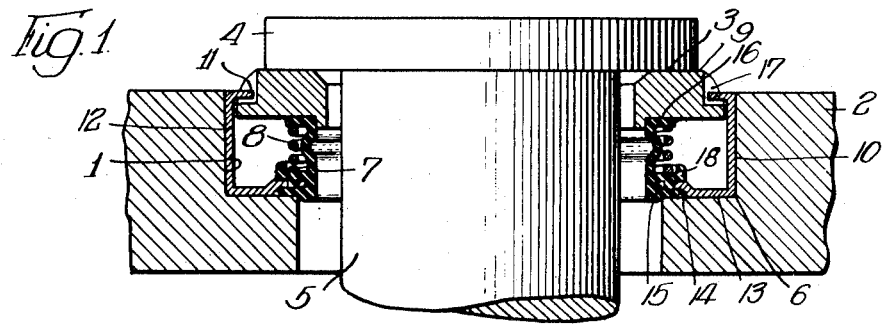
Fig. 1 is a sectional view illustrating a sealing unit installed between a housing and a flange on a rotatable shaft.
Figure 2:
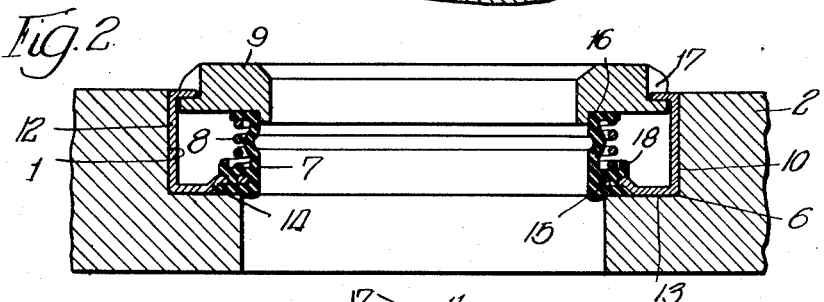
Fig. 2 is a sectional view of a sealing unit prior to installation.
Figure 3:
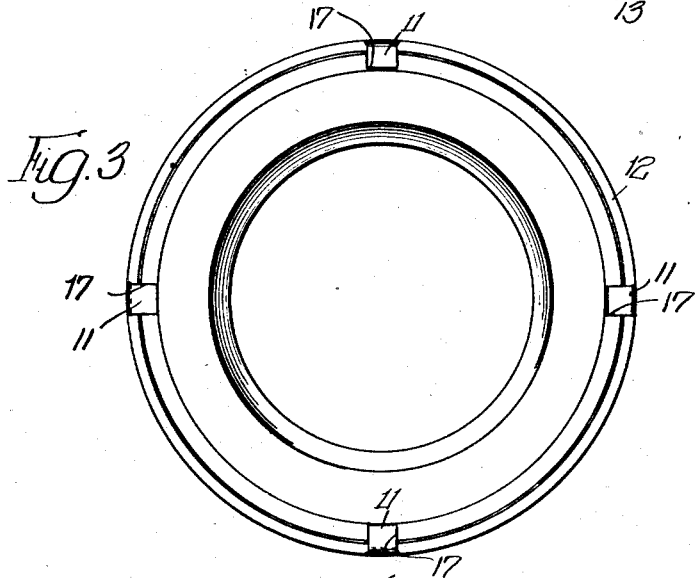
Fig. 3 is a plan view of a sealing unit.

Referring now to the drawings in more detail, the sealing unit is shown in Fig. 1 pressed into a bore 1 in a housing 2 and engages the smooth surface 3 of a flange 4 on a shaft 5 which is rotatable relative to the housing 2.

The sealing unit consists of a cup member 6, a bellows 7, a spring 8, and a sealing element 9. The cup member 6 is stamped or otherwise suitably formed of sheet metal. The diameter of its outer wall 10 is originally slightly larger than the diameter of the bore 1 into which it is to be pressed, and since the metal shell can be held to close limits, a fluid tight engagement of the cup with the housing is assured. Lugs 11 on flange 12 project radially inwardly from the free edge of the wall 10 of the cup member 6. At the closed end of the cup, a wall 13 projects radially inwardly and is axially offset at 14 to form a flange 15. The flange 15 may be imperforate or may contain perforations, as shown, for a purpose to be hereinafter explained.

The bellows 7 is molded of a suitable resilient material, such as an elastomer, and engages both sides of the flange 15 of the cup member 6 and extends through the perforations in the flange to increase the area of bonding of the bellows to the cup, as will presently appear. The end of the bellows 7, adjacent the free edge of wall 10, contains a flange which projects radially outwardly towards the wall 10 and to which is cemented the inner surface 16 of the sealing element 9.

The spring 8 engages the portion of the bellows engaging the flange 15 and the radial flange at the free end of the bellows, and is tensioned to extend the bellows 7 and urge the sealing element 9 against the surface 3 of the flange 4. As shown, the spring 8 is a coiled metallic spring, so shown by way of example only, as other types of springs or other types of tensioning devices may be substituted within the teachings of the invention.

The sealing element 9 may be composed of any material capable of presenting a low friction highly polished surface in sealing engagement with the radial surface 3 on a shaft. In addition, the member must not be corroded or otherwise affected by the fluids with which it will come in contact at the temperatures to be encountered, and oftentimes the choice of material to be used will be governed mainly by this fact.

Graphite and compounds of graphite and other materials meet these requirements in most instances. The pure graphite or graphite compound is compressed under high pressure to the shape desired, or impregnated into a fibrous material such as felt or asbestos, and then compressed into the desired shape. In other instances, hard baked inert resins, soft metal alloys and the like may be used.

The element 9 consists of an annulus having a central opening somewhat larger than the diameter of the shaft, an outer diameter enabling it to move freely in the cup 6 and to rock therein through limited arcs, and a flat outer face capable of taking a high polish and of forming a fluid tight junction with the radial surface 3 on the shaft.

As the shaft rotates, there will be set up in the element 9 a torque tending to rotate the element with the shaft; the magnitude of this torque will, of course, depend upon the coefficient of friction between the shaft flange and the element. This tendency of the element to rotate with the shaft is overcome by providing the element 9 with slots 17 which open radially outwardly and into which are projected the tongues or lugs 11 on the cup. Tongues 11 bear against the edges of the slots and thence against a relatively large mass of material in the element at points radially outwardly from the points of application of the torque forces, with the result that these forces are resisted without danger of chipping the element which may be somewhat brittle. Slots 17 are closed at their lower ends, Fig. 1, and the tongues 11 bear thereagainst to aid in holding the assembly together particularly when the element is tilted with respect to the cup to bear against a misaligned shaft flange.

Figure 4:
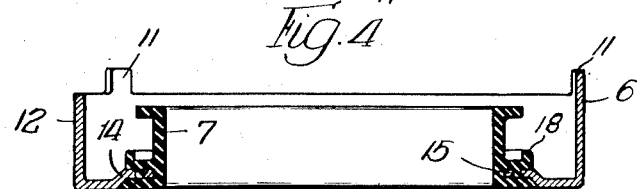
Fig. 4 is a sectional view of the cup member and bellows prior to assembly of the sealing unit.

Assembly of the unit is accomplished as follows:

The cup member 6 is suitably formed in the shape shown in Fig. 4, and the flange 15 is coated with a rubber cement to facilitate bonding an elastomer to the metal. The cup member is then placed in a mold together with material of which the bellows 7 is to be formed. The bellows 7 is then molded so that it embraces both sides of the flange 15 and is thereby bonded to the cup member in a fluid tight manner. It will be noted in Fig. 1 that the portion of the bellows below the flange 15 has thickness at least equal to the distance that the flange is offset from the bottom of the cup, and that its lower face is in the plane of that bottom or even lower. If desired, a rim 18 may be formed at either the inner or outer side of the bellows, or both, to aid in retaining the spring 8 in position. After the bellows has been molded to the cup member as shown in Fig. 4, the spring 8 is placed in position and the sealing element 9 is cemented to the bellows 7 along junction 16. The outer edge of the cup 6 and the projections 11 thereon are then rolled over the edge of the sealing element 9 so that the lugs 11 project into the slots 17 of the sealing element.

The fluid seal thus formed is a unitary structure which may be conveniently handled prior to its installation and which may be readily pressed into the bore of a housing to form a fluid tight seal therewith. The lowermost portion of the bellows engages the bottom of the housing bore to aid in maintaining a fluid tight seal. Any wear which takes place in use will be a wearing away of the sealing element 9. As any such wear occurs, the spring 8 will automatically maintain the sealing element 9 in sealing engagement with the surface 3 of the flange 4. The spring 8 also serves to maintain the sealing element 9 against the surface 3 of the flange 4 in spite of any slight longitudinal movement or axial misalignment of the shaft with respect to the housing. The sealing element 9 is free to move axially a limited distance and the spring 8 forces it into sealing engagement with the surface 3 in any position between its innermost position when the spring 8 is completely compressed and its outermost position when the lugs 11 and flange 12 prevent further outward movement of the sealing element.

A fluid seal may thus be made with a minimum number of parts, each of which is economical to produce and the assembly of which is likewise economical. By molding the bellows to the cup member, an exceptionally strong bond is secured. When the bellows is cemented to the sealing element 9, a fluid tight seal is provided from the outer face of the sealing element to the outer wall 10 of the cup member. The engagement of the logs 11 in the slots 17 of the sealing element prevent rotation of the sealing element relative to the bellows 7, the spring 8, and the cup member 6.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What is claimed is:

1. A self-contained device for forming a fluid tight seal against a planar radial face on a rotatable shaft and a stationary member through which the shaft projects, comprising: a metallic cup-like casing comprising a cylindrical outer wall and a planar end wall projecting radially inwardly from one end thereof, a tapered wall at the inner edge of said end wall, and a perforated flange projecting radially inwardly from the tapered wall and disposed in a plane parallel to said end wall; an elastomer bellows embracing both faces of said flange and extending through the perforations therein and bonded to the flange to form a fluid tight junction therewith and to form a fluid tight junction with said stationary member, said bellows extending within the casing concentrically thereof, a flange on the free end of said bellows extending radially towards said outer wall; a low friction sealing element disposed in the open end of said casing and cemented to the flange on said bellows; a spring encircling said bellows and engaging the flange thereon and the casing flange embracing portion thereof and tensioned to expand the bellows and to urge the sealing element outwardly of the casing; and means on the outer cylindrical wall of the casing engaging the element to limit the movement thereof outwardly of the casing.

2. A self-contained device for forming a fluid tight seal between a radial planar surface on a rotatable shaft and cylindrical and radial surfaces in a stationary member through which the shaft projects, comprising: a metallic cup; a cylindrical wall on said cup adapted for press fit insertion in the stationary member; a radial wall on said cup adapted to engage the radial surface on said stationary member; a flange portion on said radial wall offset from the wall; a flexible bellows bonded to said flange and filling the space between the flange and outer face of the radial wall to engage the radial surface of said stationary member and form a fluid tight seal therewith, said bellows extending from said flange concentrically through said cup towards the open end thereof; a low friction sealing element cemented to said bellows and closing the open end of said cup; lugs on said cup positioned in slots in said sealing element to hold the device together as a unit and to prevent rotation of the sealing element with respect to the cup; and spring means disposed between the bellows and cup and tensioned to urge the sealing element against the radial planar surface on the shaft.

3. A self-contained device for forming a fluid tight seal between a radial planar surface on a rotatable shaft and cylindrical and radial surfaces in a stationary member through which the shaft projects, comprising: a metallic cup; an outer cylindrical wall on said cup adapted for press fit against said cylindrical surface; a radial wall on said cup; a flexible bellows bonded to both sides of a portion of said radial wall and adapted to engage and form a seal with said radial surface; an annular sealing element composed of low friction material closing the open end of said cup; a flange on said sealing element surrounding the central opening therein and projecting towards said radial wall, said bellows being cemented to said sealing element and flange; lugs on said cup positioned in slots in said sealing element to hold the device together as a unit and to prevent rotation of the element with respect to the cup; and a spring disposed between the bellows and cup and tensioned to urge the sealing element against the radial planar surface on the shaft.

THOMAS O. KOSATKA.

REFERENCES CITED

The following references are of record in the file of this patent:

UNITED STATES PATENTS

| Number | Name | Date |
|---|---|---|
| 2,145,928 | Heinze et al. | Feb. 7, 1939 |
| 2,347,118 | Matter | Apr. 18, 1944 |
| 2,362,363 | Doede | Nov. 7, 1944 |
| 2,402,995 | Garroway | July 2, 1946 |
| 2,407,218 | Beier | Sept. 10, 1946 |